United States Patent [19]

Smith

[11] 4,397,370
[45] Aug. 9, 1983

[54] SURF SERVICE VEHICLE

[75] Inventor: Richard H. Smith, Half Moon Bay, Calif.

[73] Assignee: Healy Tibbitts Construction Co., San Francisco, Calif.

[21] Appl. No.: 272,930

[22] Filed: Jun. 12, 1981

[51] Int. Cl.³ .................. E04H 17/00; B62D 61/08
[52] U.S. Cl. ........................... 180/210; 405/197; 180/212; 180/213
[58] Field of Search ............. 180/210, 211, 212, 242, 180/213; 405/196, 197, 201

[56] References Cited

U.S. PATENT DOCUMENTS

| | | | |
|---|---|---|---|
| 1,560,393 | 11/1925 | Mossay | 180/242 |
| 2,376,419 | 5/1945 | Cole | 180/211 |
| 2,841,021 | 7/1958 | Steibel | 180/211 |
| 2,909,298 | 10/1959 | Baudhuin | 414/461 |
| 3,229,782 | 1/1966 | Hilton | 180/208 |
| 3,230,721 | 1/1966 | DeLong et al. | 405/201 |
| 3,755,932 | 9/1973 | Cargile | 405/196 |
| 3,900,077 | 8/1975 | Gee et al. | 405/197 |
| 3,909,022 | 9/1975 | Claxton | 280/6 H |
| 3,910,368 | 10/1975 | Weber et al. | 180/213 |
| 4,041,623 | 8/1977 | Miller et al. | 180/9.44 |
| 4,122,646 | 10/1978 | Sapp | 405/197 |
| 4,219,094 | 8/1980 | Sturgill | 180/242 |

Primary Examiner—John A. Pekar
Assistant Examiner—D. Lynn Fugate
Attorney, Agent, or Firm—Vernon D. Beehler

[57] ABSTRACT

An offshore service vehicle of tricycle configuration employs three vertical legs to support a platform which remains above the water surface as the vehicle travels from a dry land station outwardly to service stations offshore such, for example, as a stationary tower or anchored barge. One of the legs at a forward location is rotatable for steering. Wheels at the bottoms of the legs are individually driven by motors in sealed housings immediately adjacent of the legs.

18 Claims, 10 Drawing Figures

U.S. Patent  Aug. 9, 1983  Sheet 1 of 4  4,397,370
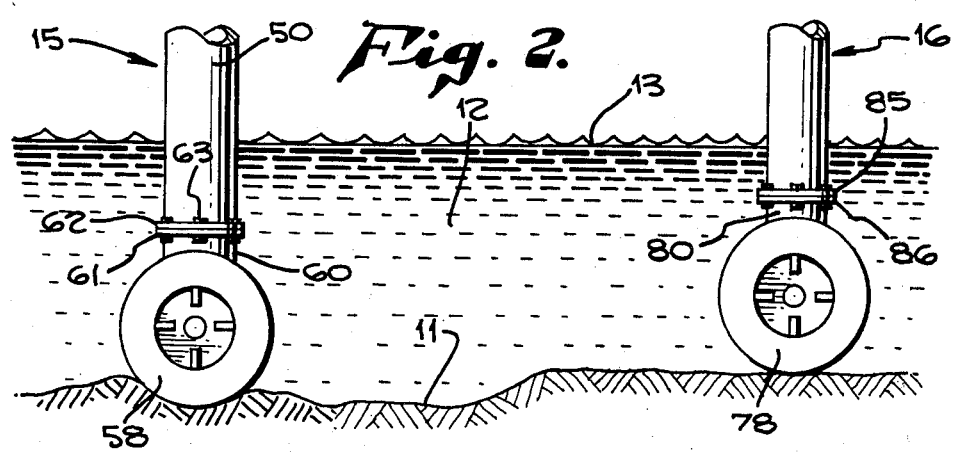
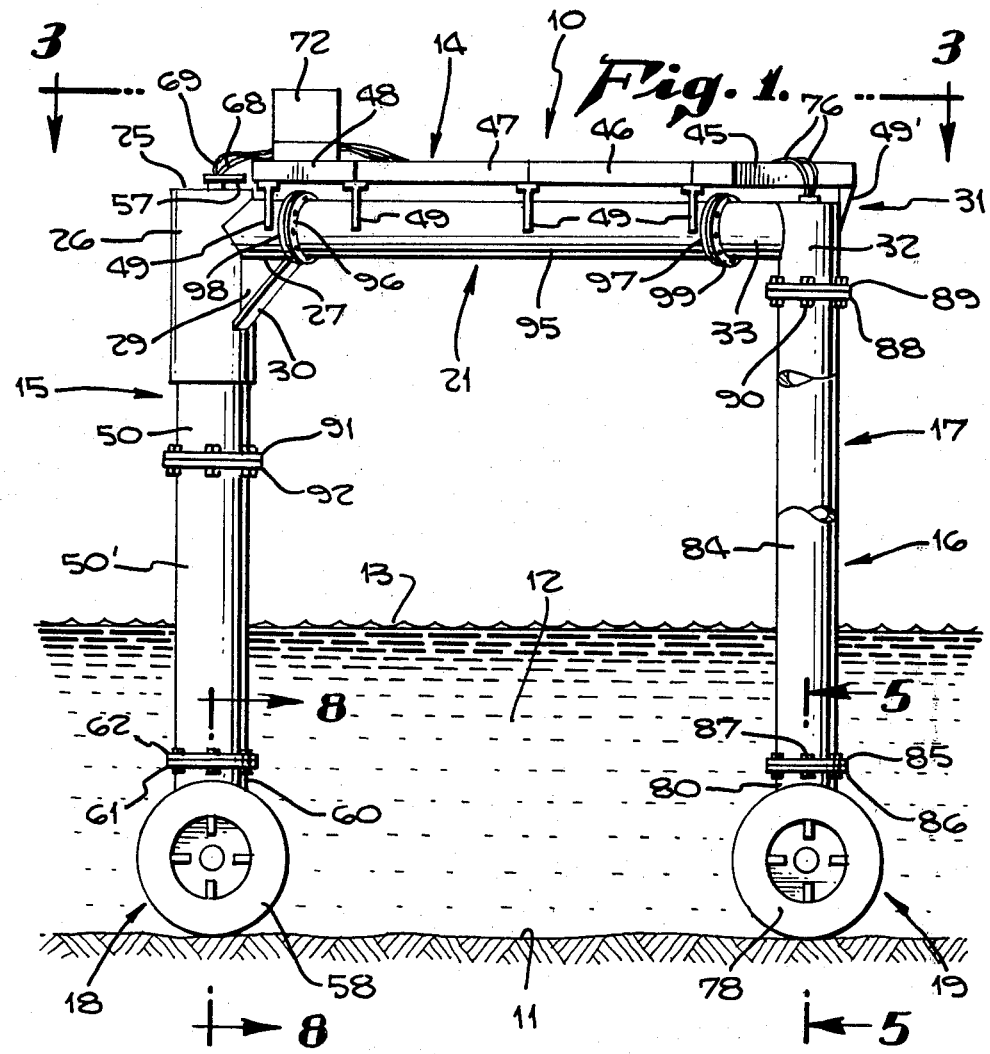

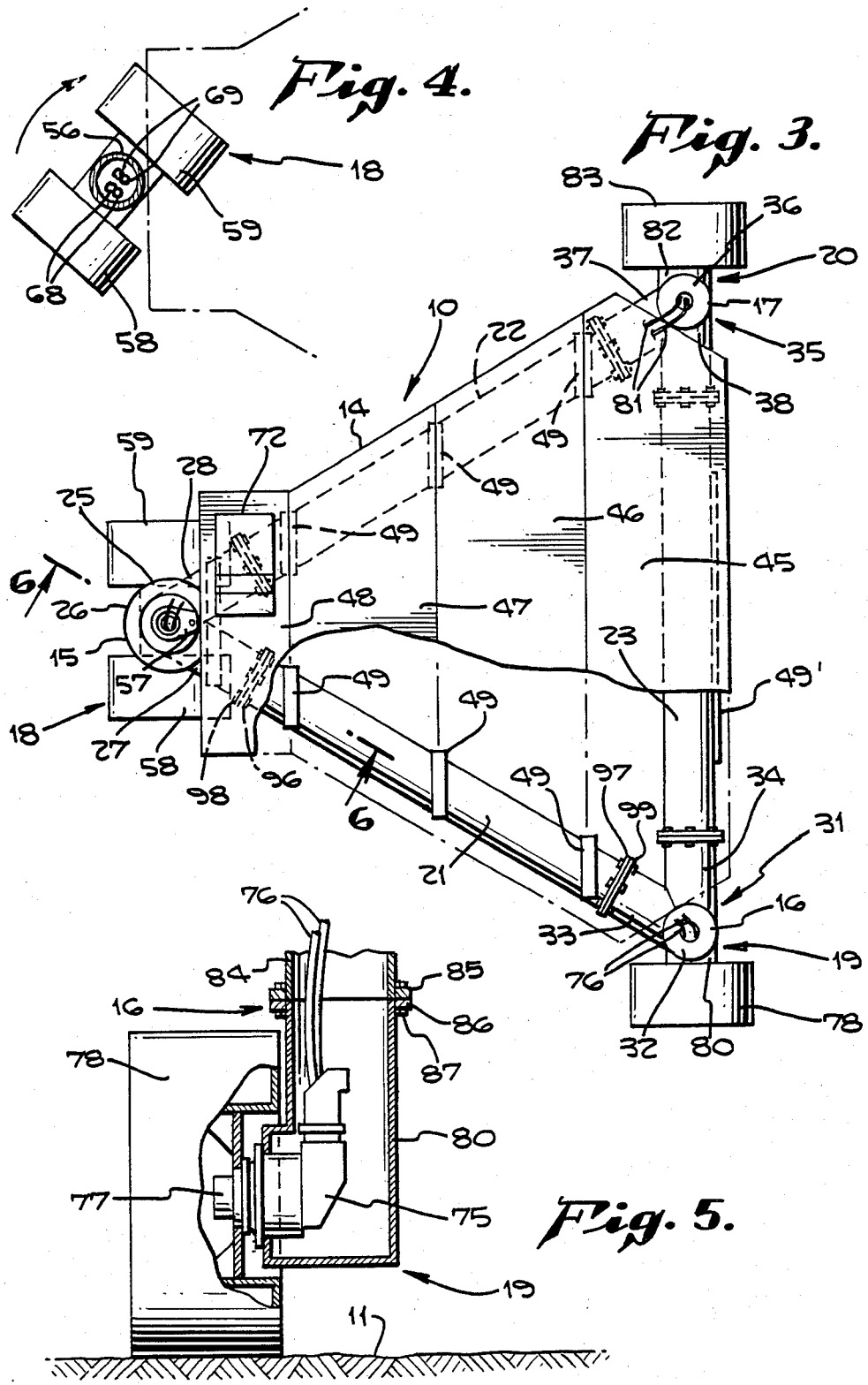

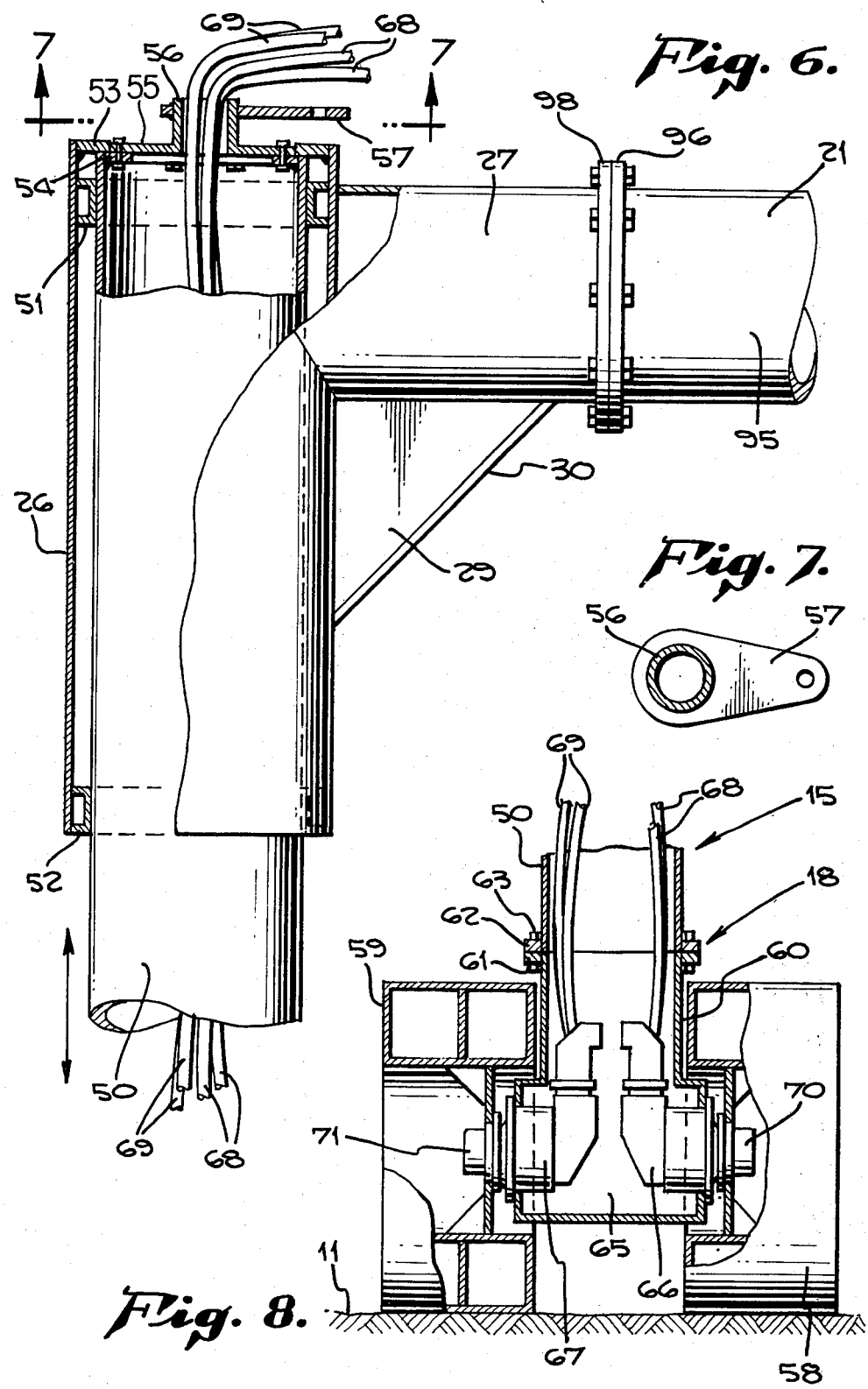

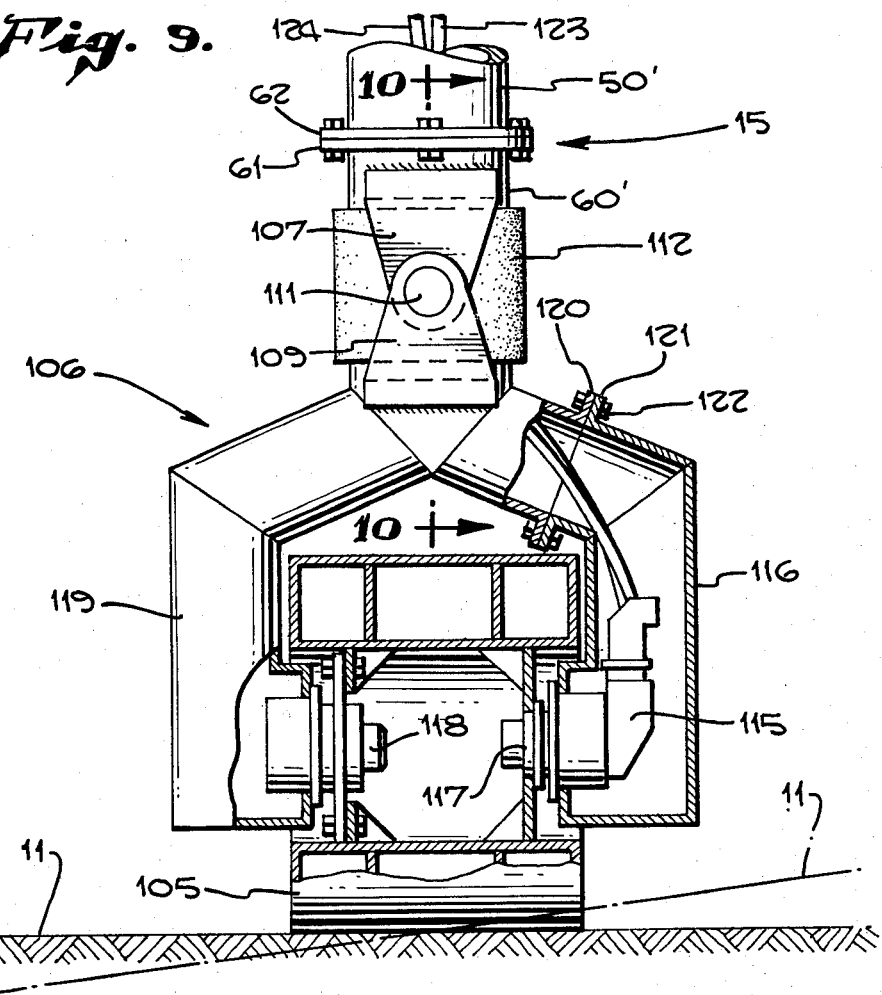
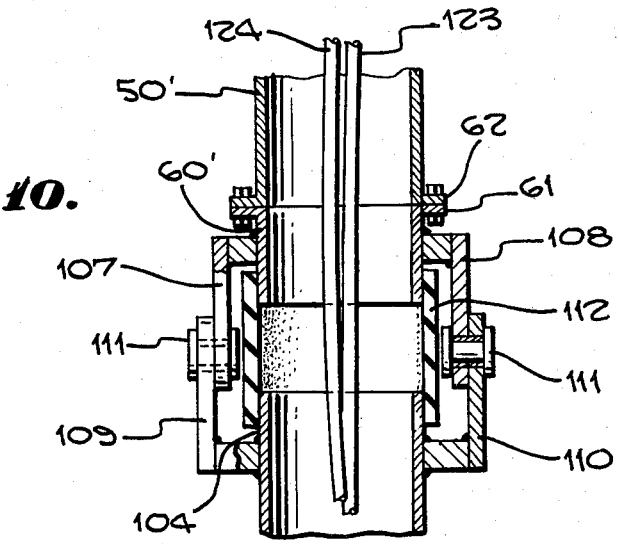
Fig. 9.
Fig. 10.

SURF SERVICE VEHICLE

In the servicing of offshore operations, especially in rough water, be they permanent towers such as have been employed for drilling and production of oil wells, or barges or comparable vessels anchored in position at sea, natural circumstances pose a continuous problem.

Should the servicing be performed by boat, there are always rough days when the surf is prohibitively high, either for transportation of supplies, for mooring at the operation, or both. Also the size of the boat must always be considered, taking into consideration the ability to moor it at the operation.

An alternative medium for supplying such operations has been by helicopter. Even when the condition of the weather is no bar to helicopter operation, a strong wind or fog might be. Additionally, for such type of servicing there is a practical limitation with respect to the load which can be carried, since not only does personnel and food need to be transported, but frequently heavy equipment becomes part of the servicing need.

Among prior structures which have been attempted for underwater operations, platforms have been employed featuring long legs which have been capable of being lifted and advanced step by step to enable the platform to travel from one location to another. Such a vehicle is exemplified by U.S. Pat. No. 3,230,721.

Although land operated vehicles such, for example, as illustrated by U.S. Pat. No. 2,909,298, have been devised with a power plant for wheels at the bottom of individual legs, such devices have been intended for travel primarily over a level surface and frequently merely along predetermined paths on such a level surface.

On the other hand, vehicles devised for traveling along the ocean bottom in submerged position are of little value where personnel and supplies need to be carried from the shore to an offshore operation.

Various vehicles have been attempted, and one also of tricycle configuration such, for example, as U.S. Pat. No. 4,041,623, but is incomplete as to particulars which would enable it to operate under virtually any kind of expected condition. For four-wheel rather than three-wheel operation, reference is made to U.S. Pat. No. 3,909,022, where a structure, though operative over a dry surface, lacks the equipment and configuration which would enable it to operate successfully under water. Other types of underwater vehicles such, for example, as those used for laying lengths of pipe in alignment with a pipeline, while operatively capable for underwater work, have not been such as could be used to transport loads of any appreciable quantity or variety.

It is therefore among the objects of the invention to provide a new and improved vehicle for servicing offshore operations which is of such character that it can be used to carry loads from the shore outwardly to the offshore operation which might be encountered at a particular location.

Another object of the invention is to provide a new and improved service vehicle capable not only of transporting a deck load to and from an offshore location but also capable of lifting a load, such for example as a boat for transportation between an anchorage and a dry storage location.

Still another object of the invention is to provide a new and improved service vehicle for travel from the shore to offshore operations and return, which is simple in design, rugged of character, and of a design such that it can travel out to relatively deep water while continuing to maintain the loading deck at an acceptable distance above the tops of the waves.

Also included among the objects of the invention is to provide a new and improved service vehicle for transportation between the shore and offshore operations which is adequately maneuverable whether with respect to direction to avoid obstacles or with respect to pulling itself out of difficult subsurface conditions.

With these and other objects in view, the invention consists of the construction, arrangement, and combination of the various parts of the device, serving as an example only of one or more embodiments of the invention, whereby the objects contemplated are attained, as hereinafter disclosed in the specification and drawings, and pointed out in the appended claims.

FIG. 1 is a side elevational view of the surf service vehicle in a position for travel.

FIG. 2 is a fragmentary side elevational view of the lower portion of the vehicle in the attitude for travel over irregular terrain.

FIG. 3 is a plan view on the line 3—3 of FIG. 1.

FIG. 4 is a fragmentary plan view of the leading portion of the chassis in turn attitude.

FIG. 5 is a fragmentary vertical sectional view on the line 5—5 of FIG. 1.

FIG. 6 is a fragmentary vertical sectional view on the line 6—6 of FIG. 3.

FIG. 7 is a cross-sectional view on the line 7—7 of FIG. 6.

FIG. 8 is a fragmentary vertical sectional view on the line 8—8 of FIG. 1.

FIG. 9 is a front elevational view of a modified structure at the same location on the vehicle as FIG. 8.

FIG. 10 is a side elevational view on the line 10—10 of FIG. 9.

In an embodiment of the invention chosen for the purpose of illustration, a complete surf service vehicle indentified by the reference character 10 is shown in FIG. 1 in a mobile attitude adapted to traverse a bottom surface 11 of a body of water 12 beneath a water surface 13. The vehicle consists primarily of a substantially horizontal frame 14 carried by three legs, namely, a forward leg 15 and two aft legs 16 and 17 in a tricycle arrangement. At the bottom of the forward leg 15 is a rolling assembly 18 which, as indicated in FIG. 4, is steerable. Rolling assemblies 19 and 20 for the aft legs 16 and 17, respectively, are relatively fixed.

The selection of a tricycle arrangement is one of serviceability and economy in that by avoiding a four wheel configuration, a spring mounting is avoided to keep all legs in contact with the ground, and none of the legs need to be vertically adjustable.

In some further particular it will be noted that the frame 14 is made up of three tubular members 21, 22 and 23 arranged in a triangular configuration with forward ends of the tubular members 21 and 22 joined at the location of the forward leg 15.

As a structural expedient, as well as to provide rigidity for the frame, there is provided on the upper end of the forward leg 15 what may be described as a fitting 25 consisting of a vertical sleeve 26 and two horizontal sleeves 27 and 28 welded to the vertical sleeve in a V-shaped arrangement. A gusset 29 serves as a triangular brace between the vertical sleeve 26 and horizontal sleeve 27, there being provided a stiffening flange 30 at the oblique edge. A similar gusset is correspondingly positioned between the vertical sleeve 26 and the other horizontal sleeve 28, not visible in the drawing figures.

At the upper end of the aft leg 16 there is provided what also may be termed a fitting 31, consisting of a vertical sleeve 32 and two horizontal sleeves 33 and 34. A similar fitting 35 with appropriate vertical sleeve 36 and horizontal sleeves 37 and 38 is provided for the other aft leg 17.

As a load-carrying expedient there are four platform sections 45, 46, 47 and 48. These extend in parallel relationship to each other between the tubular members 21 and 22. Brackets 49 on the tubular members provide support for the platform sections, and with the assistance of a bracket 49' on the tubular member 23.

For making the forward leg 15 a steerable leg, there is a lower section 50, which comprises most of the leg, rotatably disposed within the vertical sleeve 26 previously identified, serving as an upper end section of the forward leg 15. Annular fillers 51 and 52 close the clearance between the inner surface of the vertical sleeve 26 and the external surface of the lower end section 50.

To provide support there is an annular thrust bearing ring 53 welded to the top of the vertical sleeve 26 adapted to contain an annular bearing ring 54 welded to the top of the lower section 50. A keeper plate 55, which fits laterally within the thrust bearing ring 53, serves to center the lower end section 50 at the top of the vertical sleeve 26. Anchored to a hollow projection 56 on the keeper plate 55 is a steering lever 57.

In a tricycle arrangement where one leg is in either a fore or aft relationship relative to the other two there will normally be a concentration of load on the fore and aft positioned leg. The effect of load concentration is remedied by providing two wheels 58 and 59, each in turn having the load supporting character of the single rolling supports on the other two legs.

One form of rolling support 18 as shown in FIG. 8, located at the lower end of the forward leg 15, makes use of the two wheels 58 and 59. A housing 60, actually an extension of the forward leg 15, includes a flange 61 at its upper end. Complementary to the flange 61 is a flange 62 at the adjacent end of the lower section 50, actually part of the leg 15, to which the flange 61 is attached by means of bolts 63.

The housing 60 provides a sealed motor chamber 65 within which, in the initial embodiment, are located motors 66 and 67. These motors 66, 67 may preferably comprise hydraulic motors supplied in one instance by hydraulic lines 68 and in the other instance by hydraulic lines 69.

Extending from the motor 66 is an axle 70 which supports the wheel 58, the axle serving as a drive shaft from the motor. A similar axle 71 is served by the motor 67 and supports the wheel 59. In the embodiment of FIG. 8, where two separate motors are provided, it is anticipated that one or both of the motors can be supplied on one occasion from a conventional high pressure low volume pump (not shown) for high torque performance, as when climbing a relatively steep grade. As the grade levels off the motor may be switched to a conventional low pressure high volume pump (not shown). The hydraulic lines 68 and 69 previously referred to, extending upwardly through the projection 56, terminate in a control panel 72. The control panel 72 is adapted to serve motors for all of the rolling assemblies.

Because of the rugged conditions of operation which the vehicle is designed to accomodate, servicing of the motors may have to be undertaken in the field or possibly even with the vehicle partially submerged. To make it possible for a service man to work in a dry space the legs 15, 16 and 17 are of "man size" diameter. Accordingly, the service man can be let down into the leg for work on the motor irrespective of where the vehicle may be located.

Should be the vehicle be stalled offshore it is contemplated that the service man could be called upon to disconnect the motor drive leaving the wheel free to rotate while the vehicle is hauled onshore.

The rolling assembly 19 previously made reference to, and located at the lower end of the aft leg 16, is served by a motor 75 for which hydraulic lines 76 extend upwardly through the interior of the tubular aft leg 16 and thence at the upper end connect with the control panel 72. An axle 77 of the motor 75 supports a wheel 78. As in the case of the forward leg, the aft leg 16 terminates in a sealed housing 80 within which the motor 75 is located.

In a similar fashion hydraulic lines 81 supply a hydraulic motor (not shown) in a housing 82 for the rolling assembly 20. A wheel 83 implements the rolling assembly 20.

To provide versatile performance the motor 75 for the wheel 78 and the motor for the wheel 83, as well as the motors for wheels on the forward leg may be operated, in the alternative, from a high pressure low volume supply or a low pressure high volume supply.

Although hydraulic motors have been made reference to as a preferred drive it is contemplated that there may be employed a conventional transmission and clutch assembly (not shown) for the respective wheels, located in the lower end of the corresponding leg. In such an arrangement a drive shaft between the assembly and an appropriate conventional motor, such as an internal combustion engine would extend within the tubular leg enabling the motor to be mounted on the deck. By disengaging the clutch the wheels could then be disengaged to permit towing the vehicle, if the need should arise.

To improve the versatility of the structure as a whole, the aft leg 16 may be built with an intermediate tubular section 84 having a lower flange 85 bolted to a flange 86 of the housing 80 by means of bolts 87. A similar upper flange 88 for the intermediate section 84 is shown bolted to a flange 89 of the vertical sleeve 32 by bolts 90. By constructing the aft leg 17 in a similar fashion, intermediate sections of different length may be provided for building a vehicle 10 of greater or lesser draft, inasmuch as the lower end section 50 of the forward leg may be comparably extended or shortened.

In the interest of further adjustability the lower end section 50 of the foreward leg 15 may be provided with flanges 91 and 92 making it possible by varying the length of a lower end section 50' to change the overall length of the leg 15.

By employment of the flanges as noted it becomes readily possible to disassemble the structural portions of the vehicle for shipment in standard containers from job site to job site, the vehicle being too big for travel on the highways.

Another structural adjustment can be achieved by providing an intermediate tubular section 95 for the tubular member 21 having fore and aft flanges 96 and 97 bolted to respective flanges 98 on the horizontal sleeve 27 and 99 on the horizontal sleeve 33. A similar arrangement may be provided for the tubular member 22 and the tubular member 23. By designing the frame in this fashion, initial construction is implemented while at the same time making it possible to vary the overall size of the frame 14 by merely changing the overall length of the three intermediate sections.

In a modified form of the device shown in FIGS. 9 and 10 the forward leg 15 is provided with a single wheel 105 to accomodate a transversely sloping bottom surface as suggested by the broken line 11', and at the same time make provision for servicing the motor in the dry. In this form a fitting 60' attached by the flanges 61, 62 to the end section 50' has attached to it a wheel fork assembly 106 in which the single wheel 105 is mounted. To allow the wheel to tilt to accomodate the bottom surface there is on the fitting 60' fore and aft hinge connectors 107 and 108. These in turn engage respective complementary hinge connectors 109 and 110 on the wheel fork assembly 106 by use of pins 111. A tubular section 104 of the wheel fork assembly 106 accomodates one end of a flexible sleeve 112 which is joined at its other end to the fitting 60', to allow for tilting of the wheel fork assembly 106 relative to the fitting 60'. The sleeve at the same time provides access for a service man to the interior of the wheel fork assembly.

A hydraulic motor 115 in one leg 116 has a drive attachment 117 with the wheel 105 on one side, the other side of which is supported by an axle 118 on the other leg 119. Hydraulic lines 123 and 124 interconnect the motor 115 with the control panel 72.

Following the overall design the fork assembly is constructed of tubular "man size" sections to facilitate servicing of the motor. So that the wheel 105 can be dismounted flanges 120, 121 secured by bolts 122 may be provided in one or another of the legs 116, 119.

While particular embodiments of the present invention have been shown and described, it will be obvious to those skilled in the art that changes and modifications may be made without departing from the invention in its broader aspects, and, therefore, the aims of its appended claims are to cover all such changes and modifications as fall within the true spirit and scope of this invention.

Having described the invention, what is claimed as new in support of Letters Patent is as follows:

1. A service vehicle for varied terrain comprising a substantially horizontal load carrying frame, three legs having upper ends of each in anchored engagement with said frame in a triangular disposition and extending vertically downwardly from the frame, each of said legs having a communicating passageway therein and having a rolling assembly at the lower end adapted to provide for transportation of the frame over said terrain, at least one of said rolling assemblies having a motor with a sealed housing, a drive shaft in driven relationship with the motor and a rotatable traction member on the drive shaft, control means on the frame for said motor including a control connection between said control means and said motor and extending from the control means through the communicating passageway in the respective leg, one of said legs being a steerable leg having an upper end section in fixed position on said frame, a lower end section having a rotatable engagement with said upper end section and steering means in engagement with said lower end section having an operative control accessible from said frame whereby to steer said vehicle during travel.

2. A service vehicle as in clam 1 wherein the rolling assembly with the motor is on the leg which is in fore and aft relationship with respect to the other two legs.

3. A service vehicle as in claim 2 wherein there is a rolling assembly equipped with a motor on all three legs.

4. A service vehicle as in claim 1 wherein the motor is a hydraulic motor and said control means is a hydraulic control means located adjacent the forward part of the frame.

5. A service vehicle as in claim 1 wherein there is a transmission and clutch means between the traction member and the motor and a drive shaft in the respective leg between the transmission and clutch means and the motor.

6. A service vehicle as in claim 1 wherein said rolling assembly for the steerable leg comprises a pair of wheels in axial alignment with each other, a separate axle mounting each wheel in position on the leg and a separate motor for each wheel.

7. A service vehicle as in claim 6 wherein said motors are hydraulic motors responsive alternatively to a high pressure low volume hydraulic supply and to a low pressure high volume hydraulic supply.

8. A service vehicle as in claim 7 wherein one of said motors is responsive to the high pressure hydraulic supply and the other motor is responsive to the low pressure hydraulic supply.

9. A service vehicle as in claim 1 wherein said frame comprises horizontal tubular beams extending between the upper ends of said legs and wherein said legs are hollow vertical tubular columns.

10. A service vehicle as in claim 9 wherein said frame includes a plurality of platform sections in horizontal parallel relationship.

11. A service vehicle as in claim 10 wherein there are brackets on said horizontal tubular beams and releasable attachment means between said platform sections and said brackets.

12. A service vehicle as in claim 9 wherein each of said horizontal tubular beams comprises end sections and an intermediate section of the same diameter, said end sections having each an integrally anchored position adjacent the upper ends of the respective legs, said intermediate section having a releasable attachment to the respective end sections adapted to be released for replacement with an intermediate section of the same diameter and of a different length.

13. A service vehicle as in claim 9 wherein the upper end section and lower end section of the respective legs have substantially the same diameter, the upper end section having an integrally anchored position on the frame, said lower end section having a fixed position adjacent the rolling assembly and wherein there is an intermediate section of the same diameter as said end sections, said intermediate section having a releasable attachment to the respective end sections adapted to be released for replacement with an intermediate section of the same diameter and of different length.

14. A service vehicle as in claim 1 wherein said legs are hollow verticular tubular columns and there is a motor within each column adjacent the lower end section, said column comprising the sealed housing for the respective motor.

15. A service vehicle as in claim 1 wherein the rolling assembly on said steerable leg comprises a wheel fork assembly having laterally spaced parallel legs each providing a sealed inner chamber, said traction member comprising a wheel rotatably supported between said legs, said motor being located in the chamber in one of said legs.

16. A service vehicle as in claim 15 wherein there is a separable connection intermediate opposite ends of at least one of said legs whereby to enable removal and replacement of the wheel.

17. A service vehicle as in claim 15 wherein there is a connecting passageway between the passageway in the leg and said chambers and a flexible connection between said wheel fork assembly and the steerable leg whereby to enable tilting of said wheel fork assembly in a direction transverse to the fore and aft axis of said vehicle.

18. A service vehicle for varied terrain comprising a substantially horizontal load carrying frame, three legs having upper ends of each in anchored engagement with said frame in a triangular disposition and extending vertically downwardly from the frame, each of said legs having a rolling assembly at the lower end adapted to provide for transportation of the frame over said terrain, at least one of said rolling assemblies comprising a motor having a sealed housing and having a horizontally extending drive shaft with a rotatable traction member on the drive shaft, control means on the frame for said motor including a control connection between said control means and said motor, one of said legs being a steerable leg having an upper end section in fixed position on said frame, a lower end section having a rotatable engagement with said upper end section and steering means in engagement with said lower section having an operative control accessible from said frame whereby to steer said vehicle during travel, the rolling assembly on said steerable leg comprising a wheel fork assembly having laterally spaced parallel legs, said traction member comprising a wheel rotatably supported between said legs, a flexible connection between said wheel fork assembly and the steerable leg whereby to enable tilting of said wheel fork assembly in a direction transverse to the fore and aft axis of said vehicle, said wheel fork assembly having a tubular base forming a junction for said legs and said flexible connection comprising hinge means on said wheel fork assembly, complementary hinge means on said steerable leg, a pivot means for said hinge means forming a restricted joint enabling tilting of said wheel fork assembly in a direction transverse to the fore and aft axis of said vehicle and inhibiting tilting of said wheel fork assembly in said fore and aft direction, and a flexible sleeve between the steerable leg and the base of said wheel fork assembly.

* * * * *